United States Patent
Smiljanic et al.

(10) Patent No.: US 9,229,611 B2
(45) Date of Patent: Jan. 5, 2016

(54) AUTOMATIC MANAGEMENT OF CLIENT DATA CONSISTENCY

(71) Applicant: Oracle International Corporation, Redwood Shores, CA (US)

(72) Inventors: John Smiljanic, Austin, TX (US); Shailesh Vinayaka, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 346 days.

(21) Appl. No.: 13/784,990

(22) Filed: Mar. 5, 2013

(65) Prior Publication Data
US 2014/0258893 A1 Sep. 11, 2014

(51) Int. Cl.
*G06F 3/0481* (2013.01)
*G06F 17/30* (2006.01)

(52) U.S. Cl.
CPC .......... *G06F 3/0481* (2013.01); *G06F 17/3056* (2013.01); *G06F 17/30356* (2013.01)

(58) Field of Classification Search
None
See application file for complete search history.

(56) References Cited

U.S. PATENT DOCUMENTS

| | | | | |
|---|---|---|---|---|
| 4,558,413 A * | 12/1985 | Schmidt | G06F 8/71 | 707/695 |
| 5,758,358 A * | 5/1998 | Ebbo | G06F 17/3023 | |
| 6,341,291 B1 * | 1/2002 | Bentley | G06F 17/30126 | |
| 6,460,052 B1 * | 10/2002 | Thomas | G06F 17/30309 | 707/695 |
| 7,054,885 B1 * | 5/2006 | Hoffman | G06F 8/71 | |
| 7,107,594 B1 * | 9/2006 | Fischer et al. | | 719/310 |
| 7,149,760 B1 * | 12/2006 | Breuer | G06F 17/30011 | |
| 7,386,529 B2 * | 6/2008 | Kiessig | G06F 17/30067 | |
| 7,512,585 B2 * | 3/2009 | Agarwal et al. | | |
| 7,523,121 B2 * | 4/2009 | Hoang et al. | | |
| 7,523,141 B2 * | 4/2009 | Makismenka et al. | | |
| 7,620,948 B1 * | 11/2009 | Rowe et al. | | 717/171 |
| 7,711,818 B2 * | 5/2010 | Lee et al. | | 709/225 |
| 7,958,092 B2 | 6/2011 | Werner et al. | | |
| 8,347,182 B2 | 1/2013 | Brown et al. | | |
| 8,689,117 B1 * | 4/2014 | Vasilik et al. | | 715/760 |
| 8,700,560 B2 * | 4/2014 | Polo-Malouvier et al. | | 707/602 |
| 2002/0038230 A1 * | 3/2002 | Chen | G06F 17/30554 | 705/7.11 |
| 2004/0010665 A1 * | 1/2004 | Agarwal et al. | | 711/154 |
| 2004/0122927 A1 * | 6/2004 | Muehl et al. | | 709/223 |
| 2004/0148565 A1 * | 7/2004 | Davis et al. | | 715/501.1 |
| 2004/0243597 A1 * | 12/2004 | Jensen | G06T 13/40 | |
| 2005/0080766 A1 * | 4/2005 | Ghatare | | 707/3 |
| 2006/0099147 A1 * | 5/2006 | Barbera-Guillem | | 424/9.6 |
| 2006/0168558 A1 * | 7/2006 | de Seabra e Melo | G06F 8/71 | 717/105 |
| 2008/0003991 A1 * | 1/2008 | Sievers et al. | | 455/418 |
| 2008/0021739 A1 * | 1/2008 | Brock | | 705/3 |
| 2009/0204422 A1 * | 8/2009 | James et al. | | 705/2 |
| 2010/0077362 A1 * | 3/2010 | Allred et al. | | 715/866 |
| 2011/0078123 A1 | 3/2011 | Busch et al. | | |

* cited by examiner

*Primary Examiner* — Phenuel Salomon
(74) *Attorney, Agent, or Firm* — Miles & Stockbridge, P.C.

(57) ABSTRACT

A system is provided that automatically manages data consistency of a web application. When the system sends a data entity to a user interface component that the system has determined is an updatable user interface component, the system stores a version indicator for the data entity within a resource scope. When the system receives a request to update the data entity, the system compares the version indicator stored within the resource scope with a version indicator stored within a data store. When the two version indicators are identical, the system updates the data entity. When the two version indicators are not identical, the system raises an exception.

19 Claims, 5 Drawing Sheets

AUTOMATIC MANAGEMENT OF CLIENT DATA CONSISTENCY

FIELD

One embodiment is directed to web applications, and more particularly, to web applications that display within a graphical user interface of a web browser.

BACKGROUND

A web application is a computer software application that generally includes a server component, where the server component is hosted on a computer system, such as a web server, where the component is accessed over a network, such as the Internet or an intranet, and where the server component includes a resource, such as a file, document, or web page. In general, a web application also includes a user interface component that is displayed or rendered within a graphical user interface of a web browser that is hosted on a remote computer system, such as a web client. This user interface component of the web application can be hosted in a web browser-controlled environment, such as a Java® applet, or coded in a web browser-supported language, such as JavaScript, and/or a web browser-rendered markup language, such as Hypertext Markup Language ("HTML").

In general, the server component of the web application that is hosted on a web server can send data to the user interface component of the web application that is hosted on the web client. The web browser of the web client can then display or render the user interface component and the data sent to the user interface component within the graphical user interface of the web browser so that the data is visible to a user of the web browser.

SUMMARY

One embodiment is directed to a system that automatically manages data consistency of a web application. The system receives a request for a resource of the web application from a user interface component, where a data entity is associated with the resource. The system further determines that the user interface component is an updatable user interface component. The system further retrieves a version indicator for the data entity from a data store, where the version indicator indicates a version of the data entity. The system further stores a mapping of an identity of the data entity and the version indicator within a resource scope, where the resource scope includes a data repository associated with the resource, and where the resource scope is associated with a web browser session. The system further sends the data entity to the user interface component.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is directed to a system that can send a data entity to a user interface component of a web application, where a data entity is a logical organization of data. The system can determine that the data entity is in use by the user interface component, and can further determine that the user interface component is an updateable user interface component. The system can then use that information to automatically manage a version indicator for the data entity. When the system receives a request to update the data entity by the user interface component, the system can use the version indicator to ensure that the version of the data entity that was sent to the user interface component (and that is being displayed or rendered within the user interface component) is consistent with a latest version of the data entity in a data store, before updating the data entity.

As previously described, a web application is a computer software application that is accessed over a network, such as the Internet or an intranet. Web applications can include one or more components. A component of a web application, as understood by one of ordinary skill in the relevant art, is a collection of software modules that can provide the web application with specific functionality for displaying data in a graphical user interface of a web browser when executed by a processor, where the collection of software modules can encapsulate a set of related functions, data, or a combination of the two. A component can refer to the collection of software modules and can also refer to the data displayed in the graphical user interface of the web browser by the software modules when executed by the processor.

A web application can include at least one server component and at least one user interface component. A server component of a web application is a component that can provide functionality relating to how data is displayed to a user in a graphical user interface of a web browser. A server component is generally hosted by a server, such as a web server. Further, a user interface component of a web application is a component that can be displayed on a graphical user interface of a web browser to a user. A user interface component is generally hosted by a web client that also hosts the web browser. Examples of web browsers include an Internet Explorer® web browser, a Firefox® web browser, a Chrome® web browser, a Safari® web browser, and an Opera® web browser.

In general, a requirement of a web application environment is data consistency. For example, when a user of a web application makes a modification to data stored within the web application, the web application should verify that a user is viewing the latest version of the data before the user makes a modification to the data. This is because, in a web environment, a plurality of users may access the data stored within the web application. By verifying that a user is viewing the latest version of the data, the web application can prevent a user from unintentionally overwriting another user's modification to the data. In other words, if a user is viewing one version of data, where the data stored within the web application is a newer version of data (i.e., the data stored within the web application has been modified, and the user has not refreshed his view of the data), there is a risk that the user may make an inconsistent modification to the data by updating the older version of the data. Such an inconsistent modification can lead to corruption of the data, and the verification of a version of the data being updated by the user can prevent such data corruption. However, some traditional techniques for preventing data corruption can require an application developer to customize the web application to manage version indicators for various user interface components. Such application developer intervention can require expert knowledge and significantly increase development time required to develop a web application. Further, other traditional techniques for preventing data corruption can require that a server component of the web application store a copy of every data entity that is rendered in a resource scope (or broader scope). However, the storage of every data entity can significantly increase processing and storage requirements of the web application.

Thus, according to an embodiment, a method and system for automatically managing client data consistency is provided that requires minimal application developer intervention. The method and system can utilize information about when a data entity (i.e., a logical organization of data) is displayed or rendered in an updatable user interface component, and information about a version indicator for the data entity to efficiently management consistency between a user interface component of a web application, and a server component of the web application. More specifically, by keeping track of which version of a data entity has been displayed or rendered within an updatable user interface component, the method and system can verify that the version of the data entity that is displayed or rendered matches the version of the data entity in a data store. Further, the method and system are not required to store information for every data entity in a resource scope. Rather, the method and system can store information for each entity that is rendered in an updateable user interface component. Such a method and system are further described in greater detail, according to several example embodiments.

Figure 1:
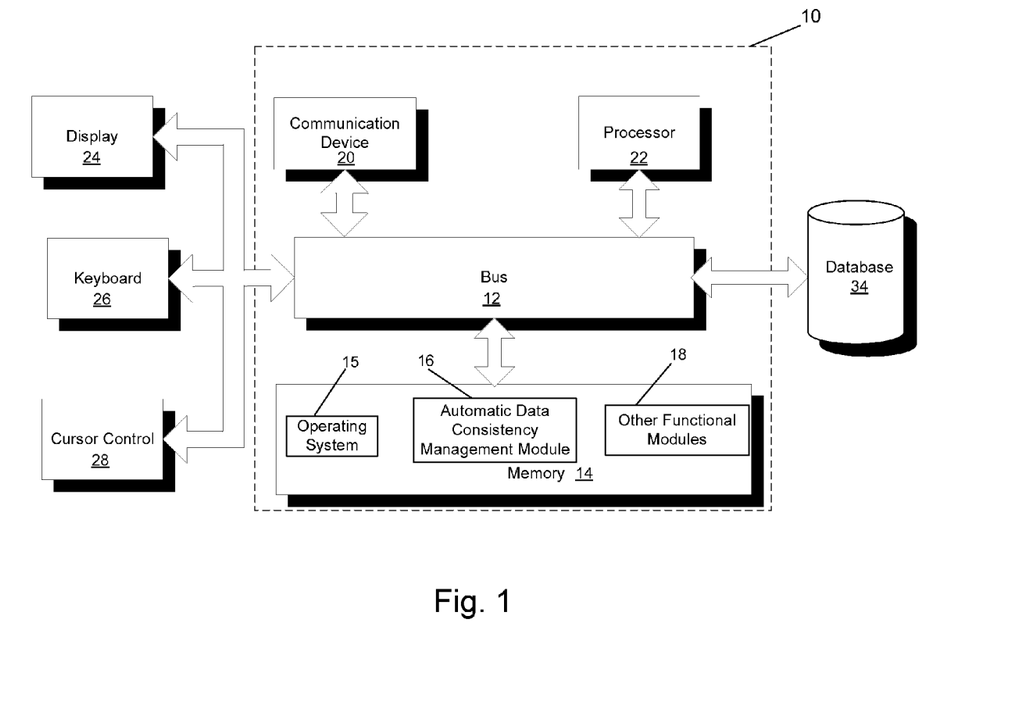
FIG. 1 illustrates a block diagram of an automatic data consistency management system that can implement an embodiment of the invention.

FIG. 1 illustrates a block diagram of an automatic data consistency management system 10 that can implement one embodiment of the invention. Automatic data consistency management system 10 includes a bus 12 or other communications mechanism for communicating information between components of automatic data consistency management system 10. Automatic data consistency management system 10 also includes a processor 22, operatively coupled to bus 12, for processing information and executing instructions or operations. Processor 22 may be any type of general or specific purpose processor. Automatic data consistency management system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Automatic data consistency management system 10 further includes a communication device 20, such as a network interface card or other communications interface, to provide access to a network. As a result, a user may interface with automatic data consistency management system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with automatic data consistency management system 10.

According to one embodiment, memory 14 can store software modules that may provide functionality when executed by processor 22. The modules can include an operating system 15, an automatic data consistency management module 16, as well as other functional modules 18. Operating system 15 can provide an operating system functionality for automatic data consistency management system 10. Automatic data consistency management module 16 can provide functionality for automatically managing data consistency, as will be described in more detail below. In certain embodiments, automatic data consistency management module 16 can comprise a plurality of modules, where each module provides specific individual functionality for automatically managing data consistency. Automatic data consistency management system 10 can also be part of a larger system. Thus, automatic data consistency management system 10 can include one or more additional functional modules 18 to include the additional functionality. For example, functional modules 18 may include modules that provide additional functionality, such as modules of the "Oracle Application Development Framework" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
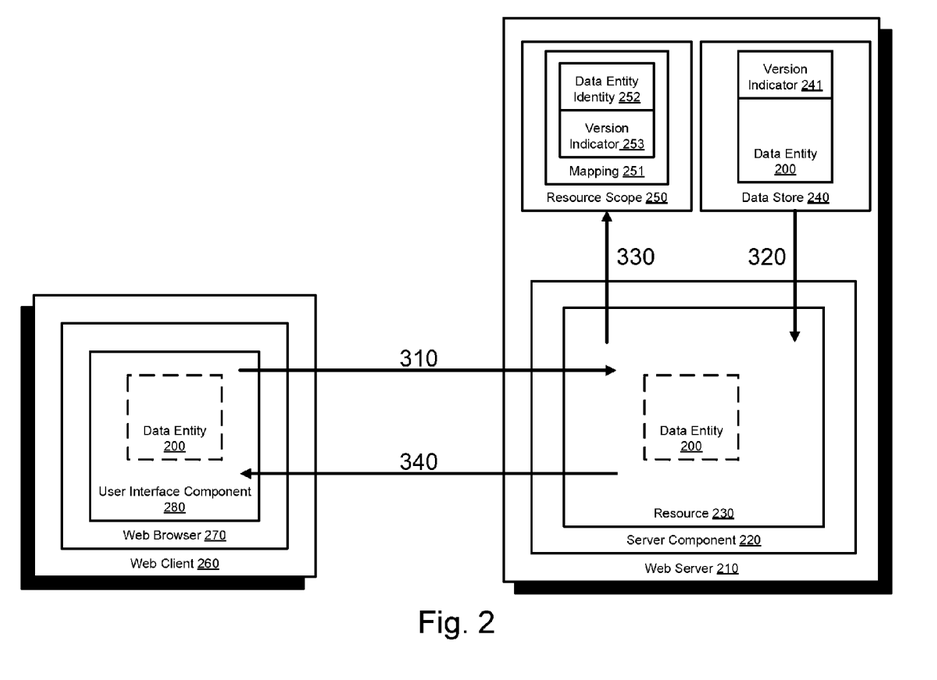
FIG. 2 illustrates a block diagram of a web application framework that receives a request for a resource, where a data entity is associated with the resource.

FIG. 2 illustrates a block diagram of a web application framework that receives a request for a resource, where a data entity is associated with the resource. According to the embodiment, the web application framework includes a web server 210 and a web client 260. Web server 210 is computer system that includes a computer software application that distributes data, such as a file, document, or a web page, over a network, such as the Internet or an intranet. In certain embodiments, web server 210 includes both the computer software application and the computer system. In other embodiments, web server 210 includes only the computer software application, where web server 210 is hosted on a separate computer system not illustrated in FIG. 2. Web client 260 is a computer system that includes a computer software application that receives data, such as a file, document, or a web page, over a network, such as the Internet or an intranet. In certain embodiments, web client 260 includes both the computer software application and the computer system. In other embodiments, web client 260 includes only the computer software application, where web client 260 is hosted on a separate computer system not illustrated in FIG. 2.

According to the embodiment, web server 210 hosts a server component 220. As previously described, server component 220 is a component of a web application that can provide functionality relating to how data is displayed to a user in a graphical user interface of a web browser. Server component 220 can include a resource 230, where resource 230 is stored within server component 220. A resource is an example of data that can be displayed in a graphical user interface of a web browser, where resource 230 includes one or more data entities. Examples of resources include a file, a document, and a web page. Further, web server 210 hosts a data store 240 and a resource scope 250. Data store 240 is a data repository that persistently stores data. In certain embodiments, data store 240 can persistently store one or more data entities, and in some of those embodiments, the one or more data entities are data entities of a resource, such as resource 230. Resource scope 250 is a data repository associated with a resource, where resource scope 250 is associated with a specific web browser session. A web browser session, as understood by one of ordinary skill in the art, is an interactive exchange between a web browser and a web server. The web browser session can be associated with a specific user interface component and a specific resource. In the illustrated embodiment, resource scope 250 is hosted by web server 210. However, in an alternate embodiment, resource scope 250 can be hosted in a different location. For example, resource scope 250 can be hosted by web client 260. More specifically, in this example, resource scope 250 can be stored within a hidden field, a browser cookie, or a uniform resource locator ("URL") stored within a web browser of web client 260, such as web browser 270. Further, resource scope 250 may be managed by server component 220. The functionality of resource scope 250 is further described below in greater detail.

Also according to the embodiment, web client 260 hosts a web browser 270. Web browser 270 is a computer software application that receives data over a network, such as the Internet or an intranet, and displays or renders the data within a graphical user interface. Web browser 270 can include user interface component 280, where user interface component 280 is stored within web browser 270. As previously described, user interface component 280 is a component of a web application that is displayed or rendered within a graphical user interface of a web browser.

According to the embodiment, at 310, server component 220 receives a request from user interface component 280, where the request is a request for resource 230, and where data entity 200 is a data entity of resource 230. As previously described, a data entity is a logical organization of data, and a resource can include one or more data entities. For example, a data entity can be a department data entity, where a department data entity is a logical organization of department data, such as a department name, and a department location. A resource, such as a web page, can include one or more department data entities, where each department data entity can represent a different department that can be displayed or rendered within a graphical user interface of a web browser. As another example, a data entity can be an employee data entity, where an employee data entity is a logical organization of employee data, such as an employee name and an employee address. A resource, such as a web page, can include one or more employee data entities, where each employee data entity can represent a different employee that can be displayed or rendered within a graphical user interface of a web browser. According to the embodiment, a data entity can also define a data entity identity. A data entity identity is an identifier that uniquely identifies the data entity. An example of a data entity identity is a primary key.

In certain embodiments, server component 220 determines that user interface component 280 is an updatable user interface component. An updatable user interface component is a user interface component that is capable of modifying a data entity that it receives from a server component, and is further capable of requesting that the server component update the data entity based on the modification made by the user interface component. According to these embodiments, server component 220 can determine that user interface component 280 is an updatable user interface component due to a data binding framework that declaratively binds a user interface component to a data entity. As one of ordinary skill in the art would readily appreciate, "declaratively bind" means define, using a high-level language, a binding between a user interface component and a data entity. In these embodiments, the request for resource 230 can also include a request for an indication whether data entity 200 of resource 230 is updatable. When server component 220 receives the request for resource 230, server component 220 can consult data binding information of data entity 200 associated with user interface component 280 to determine that user interface component 280 is an updatable user interface component. Data binding information is information that indicates a binding (as well as a type of binding) between a data entity and a user interface component, where the data binding information is provided by the data binding framework.

At 320, in accordance with the embodiment, server component 220 retrieves data entity 200 from data store 240. This is illustrated in FIG. 2, where data entity 200 is illustrated using dotted lines within server component 220. Data entity 200 can also include a data entity identity. According to the embodiment, server component 220 also retrieves version indicator 241 from data store 240. A version indicator, such as version indicator 241, is an attribute that indicates a version of a data entity, where the version indicator can be defined by an application developer of a web application. According to the embodiment, version indicator 241 can indicate a version of data entity 200. In certain embodiments, a version indicator, such as version indicator 241, can be a sequence. In alternate embodiments, a version indicator, such as version indicator 241, can be a timestamp.

Thus, according to this embodiment, version indicator 241 is retrieved from data store 240 because data entity 200 is rendered or displayed in at least one updatable user interface component (not illustrated in FIG. 2). When data entity 200 is updated, server component 220 stores a version indicator for data entity 200 within data store 240.

According to the embodiment, at 330, server component 220 stores mapping 251 within resource scope 250, where mapping 251 is a mapping of data entity identity 252 and version indicator 253. As previously described, resource scope 250 is a data repository associated with a resource, where resource scope 250 is associated with a web browser session. Thus, according to the embodiment, resource scope 250 stores data for a web browser session of web browser 270 associated with resource 230. The data stored within resource scope 250 is specific to the data that is visible to user interface component 280 and that is associated with resource 230. Thus, according to the embodiment, server component 220 stores the data identity of data entity 200 as data entity identity 252 within mapping 251 of resource scope 250. Further, according to the embodiment, server component 220 stores version indicator 241 as version indicator 253 within mapping 251 of resource scope 250. Thus, from the perspective of user interface component 280, mapping 251 associates version indicator 253 with data entity 200.

According to one embodiment, a version indicator is only stored within a resource scope for a data entity if the data entity is rendered or displayed in at least one updatable user interface component. Further, the version indicator is no longer stored within the resource scope for the data entity, if the data entity is no longer rendered or displayed in at least one updatable user interface component. Storing the version indicator within the resource scope for the data entity only if the data entity is rendered or displayed in at least one updatable user interface component is identified as "automatically" storing the version indicator within the resource scope. For data entities that are only rendered or displayed in one or more non-updatable user interface components, no version indicator is stored within the resource scope. Further, for data entities that are not rendered or displayed, no version indicator is stored within the resource scope. For example, at time $t_0$, no version indicators are stored within a resource scope for any data entities. At time $t_1$, when a data entity is sent to a user interface component, and when the user interface component is an updatable user interface component, a version indicator is stored within a resource scope for that data entity. The version indicator is stored within the resource scope as long as the data entity is displayed or rendered in at least one updatable user interface component (such as the updatable user interface component that received the data entity). At time $t_2$, where the user interface component no longer displays or renders the data entity (and assuming no other updatable user interface components display or render the data entity), the version indicator is no longer stored within the resource scope. In certain embodiments, the version indicator stored within the resource scope is the only version indicator stored within the resource scope for the data entity.

At 340, in accordance with the embodiment, server component 220 sends data entity 200 to user interface component 280. This is illustrated in FIG. 2, where data entity 200 is illustrated using dotted lines within user interface component 280. Data entity 200 can further be displayed or rendered within user interface component 280, where user interface component 280 can be displayed or rendered within a graphical user interface of web browser 270.

Figure 3:
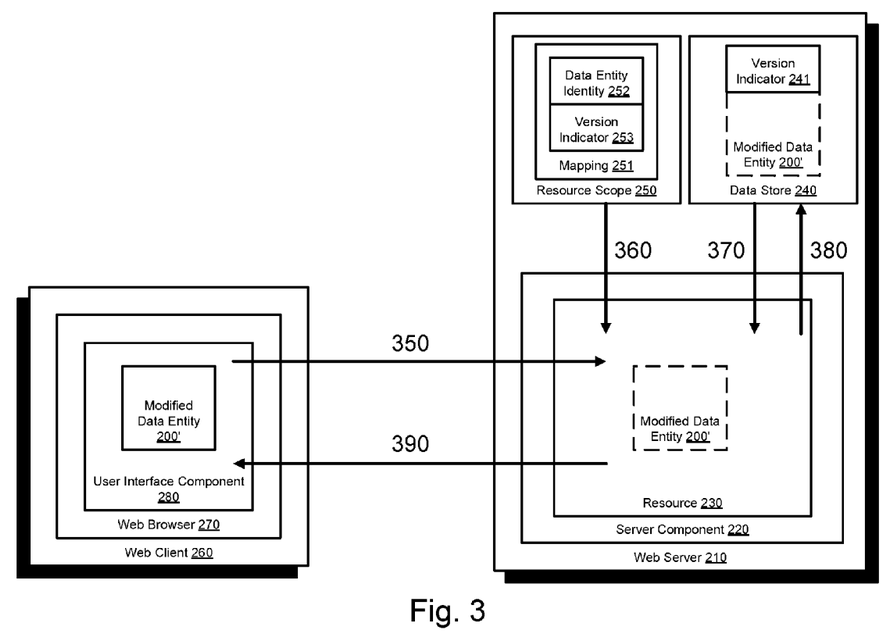
FIG. 3 illustrates a block diagram of a web application framework that receives a request to update a data entity of a resource.

FIG. 3 illustrates a block diagram of a web application framework that receives a request to update a data entity of a resource. According to the embodiment, a user can modify data entity 200 of FIG. 2 using user interface component 280 (illustrated in FIG. 3 as modified data entity 200'). For example, where a data entity is a department data entity, a user can modify the department data entity by modifying a department name and/or a department location. In another example, where a data entity is an employee data entity, a user can modify the employee data entity by modifying an employee name and/or an employee address. Subsequently, at 350, server component 220 receives a request from user interface component 280, where the request is a request to update data entity 200 of resource 230 from FIG. 2 with modified data entity 200'. In certain embodiments, the request can include modified data entity 200', and this is illustrated in FIG. 3, where modified data entity 200' is illustrated using dotted lines within server component 220.

In accordance with the embodiment, at 360, server component 220 retrieves data entity identity 252 and version indicator 253 from mapping 251 of resource scope 250. Server component 220 can retrieve data entity identity 252 and version indicator 253 by determining a data entity identity of modified data entity 200', and looking up the data entity identity within mapping 251 of resource 250.

At 370, server component 220 retrieves version indicator 241 from data store 250. According to the embodiment, server component 220 then compares version indicator 253 with version indicator 241 to determine whether the two version indicators are identical. Through this comparison, server component 220 can determine whether data entity 200 of FIG. 2 has been updated by another user interface component. According to an embodiment, data entity 200 of FIG. 2 may be updated by another user interface component after server component 220 sends data entity 200 of FIG. 2 to user interface component 280, but before server component 220 receives a request from user interface component 280 to update data entity 200 of resource 230 from FIG. 2 with modified data entity 200'. Thus, through the comparison of the two version indicators, server component 220 can maintain a data consistency of data entity 200 of FIG. 2.

When version indicator 253 is identical to version indicator 241, then, at 380, server component 220 updates data entity 200 of FIG. 2 that is stored within data store 240 with modified data entity 200' (illustrated in FIG. 3 with dotted lines). More specifically, server component 220 replaces data entity 200 of FIG. 2 that is stored within data store 240 with modified data entity 200', so that modified data entity 200' is stored within data store 240.

Alternatively, when version indicator 253 is not identical to version indicator 241, then, at 390, server component 220 raises an exception. As a result of raising the exception, server component 220 disallows an update to data entity 200 of FIG. 2 stored within data store 240. Further, in raising the exception, server component 220 can send the exception to user interface component 280. User interface component 280 can then handle the exception in any manner, such as displaying an error message, or requesting that a user refresh data entity 200 of FIG. 2 before making a modification.

Figure 4:
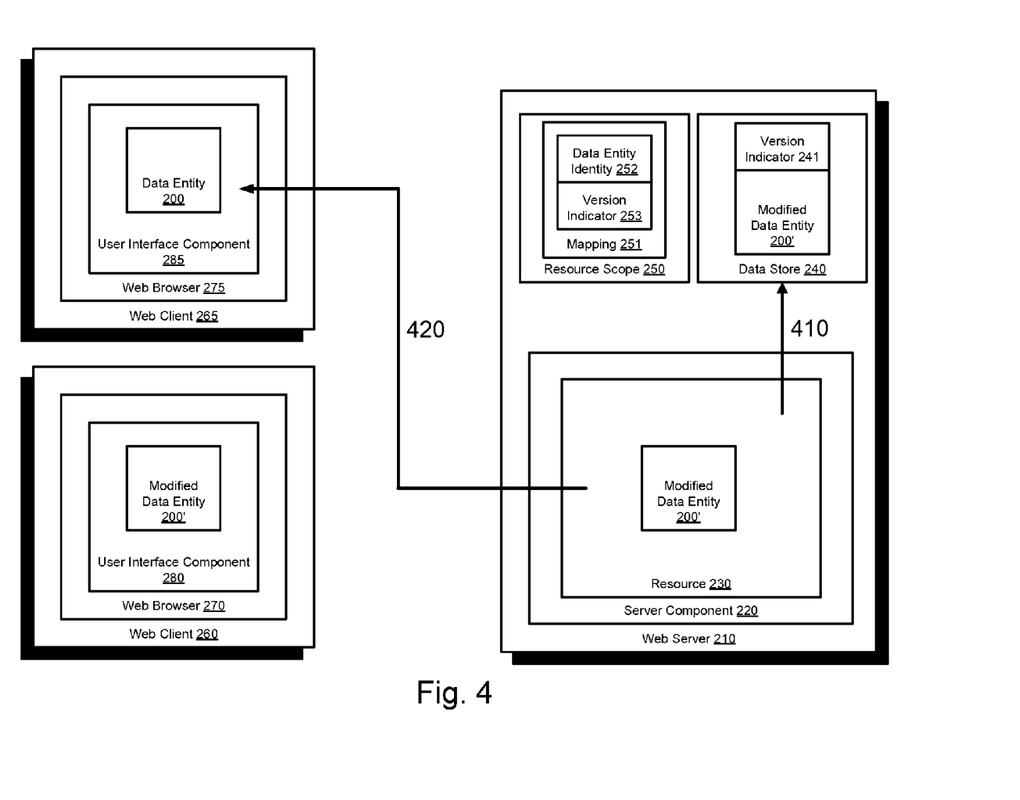
FIG. 4 illustrates a block diagram of a web application framework that notifies one or more user interface components upon updating a data entity.

FIG. 4 illustrates a block diagram of a web application framework that notifies one or more user interface components upon updating a data entity. According to the embodiment, the web application framework includes a web client 265, where web client 265 is an additional web client that is in addition to web client 260. This is an example embodiment, and in other embodiments, the web application framework can include a plurality of additional web clients (not illustrated in FIG. 4). According to the embodiment, web client 265 hosts a web browser 275, where web browser 275 is similar to web browser 270. Web browser 275 can include user interface component 285, where user interface component 285 is stored within web browser 275, and where user interface component 285 is similar to user interface component 280. Further, user interface component 285 can receive data entity 200 from server component 220 and display or render data entity 200 within user interface component 285, where user interface component 285 is displayed or rendered within a graphical user interface of web browser 275. According to the embodiment, a separate resource scope (not illustrated in FIG. 4) can be stored for user interface component 285.

At 410, in accordance with the embodiment, server component 220 increments version indicator 241 stored within data store 240. The incrementing of version indicator 241 indicates that the data entity (i.e., modified data entity 200') has been updated, and thus, a new version of the data entity (i.e., modified data entity 200') is stored within data store 240. In an alternate embodiment, when another user interface component updates the data entity (i.e., modified data entity 200') stored within data store 240, server component 220 can also increment version indicator 241.

According to the embodiment, at 420, server component 220 sends a notification to user interface component 285 that version indicator 241 has been incremented. In alternate embodiments where there are additional user interface components, server component 220 can send the notification to those user interface components as well. In some of those embodiments, server component 220 does not send the notification to the user interface component that initiated the update of the data entity (i.e., modified data entity 200'). According to the embodiment, in response to receiving the notification, user interface component 285 can display or render modified data entity 200'. In one embodiment, user interface component 285 can first request resource 230 from server component 220, where modified data entity 200' is associated with resource 230, and upon receiving modified data entity 200' from server component 220, can subsequently display or render modified data entity 200'.

According to an embodiment, a notification that a version indicator has been incremented (and thus, that a data entity has been updated) can be sent to a user interface component when the data entity is displayed or rendered within the user interface component. Further, in an alternate embodiment, the notification can be sent to a user interface component when the data entity is partially displayed or rendered within the user interface component. For example, at time $t_0$, a first user interface component can display a department name and a department location of a department data entity, and a version indicator of 1 can be stored in a resource scope associated with the first user interface component. At time $t_1$, a second user interface component can update the department name and the department location of the department data entity, and a version indicator of 2 can be stored with a data store. At time $t_2$, the first user interface component can send a request for a resource, where the department data entity is associated with the resource, and can partially display only the department name of the department data entity, where the department location of the department data entity is already displayed within the first user interface component. According to the embodiment, the first user interface component can receive a notice that the version indicator for the department data entity has been incremented from 1 to 2. In response to the notification, the first user interface component can re-display the department location of the department data entity, as well as display the department name of the department entity, so that all modifications to the department data entity are displayed within the first user interface component.

Figure 5:
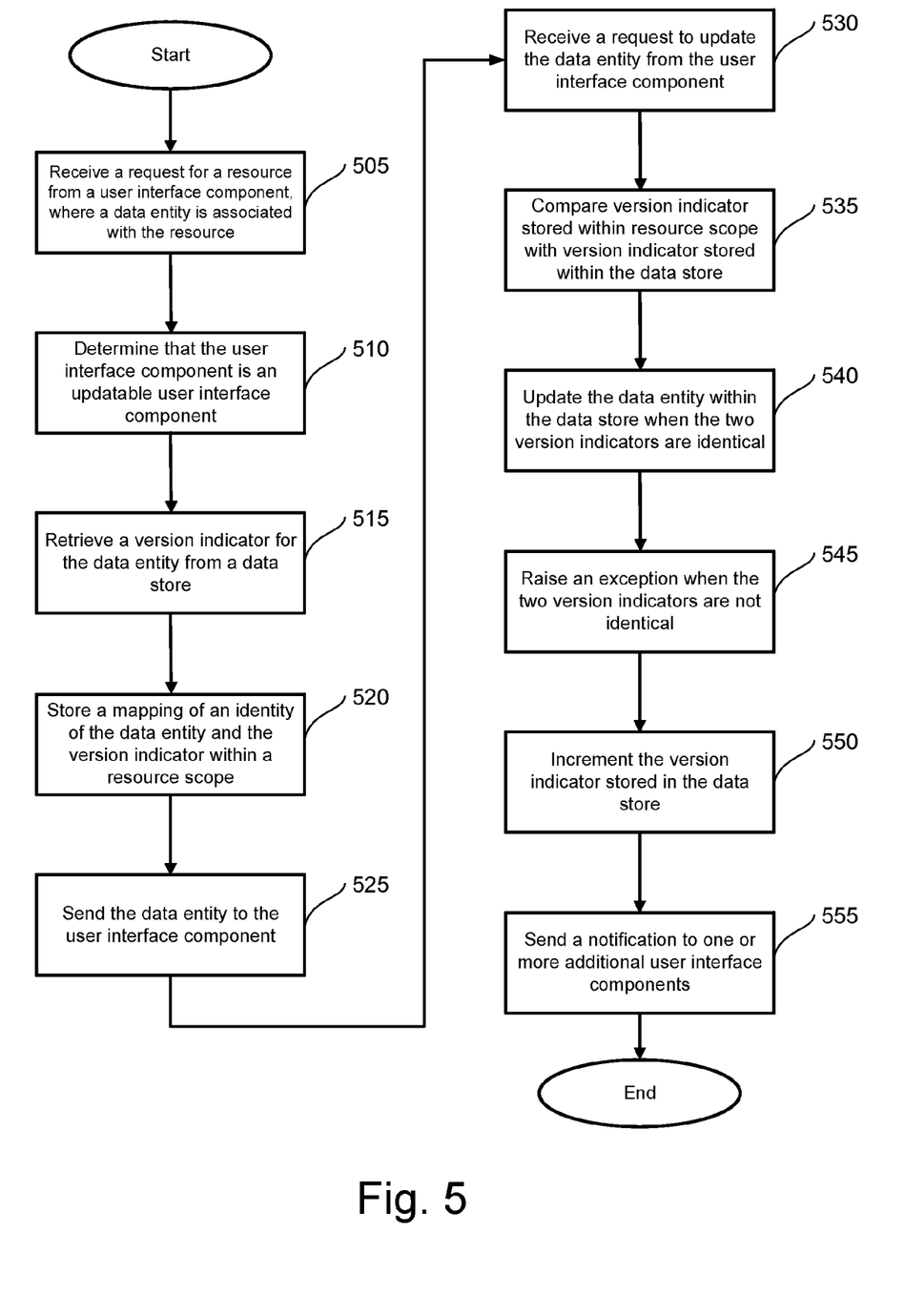
FIG. 5 illustrates a flow diagram of the functionality of an automatic data consistency management module, according to an embodiment of the invention.

FIG. 5 illustrates a flow diagram of the functionality of an automatic data consistency management module (such as automatic data consistency management module 16 of FIG. 1), according to an embodiment of the invention. In one embodiment, the functionality of the flow diagram of FIG. 5 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 505, a request for a resource of a web application is received from a user interface component. A data entity can be associated with the resource. The flow proceeds to 510. At 510, it is determined that the user interface component is an updatable user interface component. In certain embodiments, the user interface component is declaratively bound to the data entity, and the data entity determines whether the user interface component is an updatable user interface component. The flow proceeds to 515. At 515, a version indicator for the data entity is retrieved from a data store, where the version indicator indicates a version of the data entity. In certain embodiments, the version indicator is a sequence. In alternate embodiments, the version indicator is a timestamp. The flow proceeds to 520.

At 520, a mapping of an identity of the data entity and the version indicator is stored within a resource scope. The resource scope can include a data repository associated with the resource, where the resource scope is associated with a web browser session. In certain embodiments, the resource scope is stored with a web server. In other embodiments, the resource scope is stored within a web client that hosts the user interface component. Further, in certain embodiments, the version indicator stored within the resource scope is automatically stored within the resource scope when the data entity is displayed in at least one updatable user interface component. In some of these embodiments, the version indicator is no longer stored within the resource scope when the data entity is no longer displayed in the at least one updatable user interface component. In certain embodiments, the version indicator stored within the resource scope is the only version indicator stored within the resource scope for the data entity. The flow proceeds to 525. At 525, the data entity is sent to the user interface component. In certain embodiments, the data entity is displayed within the user interface component. In some of these embodiments, the user interface component is further displayed within a graphical user interface of a web browser. The flow proceeds to 530.

At 530, a request to update the data entity is received from the user interface component. The flow proceeds to 535. At 535, the version indicator stored within the resource scope is compared within the version indicator stored within the data store. The flow proceeds to 540. At 540, when the version indicator stored within the resource scope is identical to the version indicator stored within the data store, the data entity is updated within the data store. The flow then proceeds to 545. At 545, when the version indicator stored within the resource scope is not identical to the version indicator stored within the data store, an exception is raised. The flow proceeds to 550.

At 550, the version indicator stored in the data store is incremented. In certain embodiments, the version indicator is incremented when the user interface component updates the data entity within the data store. In other embodiments, the version indicator is incremented when an additional user interface component updates the data entity within the data store. The flow proceeds to 555. At 555, a notification that the version indicator stored within the data store has been incremented is sent to one or more additional user interface components. In certain embodiments, the notification is not sent to the additional user interface component that updated the data entity. In certain embodiments, the notification is sent to the one or more additional user interface components when the data entity is either displayed or partially displayed within the one or more additional user interface components. Further, in certain embodiments, in response to the notification that the version indicator stored within the data store has been incremented, the data entity is displayed within each of the one or more additional user interface components. The flow then ends.

Thus, according to an embodiment, a system can maintain a version indicator for one or more data entities that are displayed or rendered within an updatable user interface component. The system can then compare a version indicator stored for the user interface component with a version indicator stored within a data store, in order to determine that a data entity that is updated by the user interface component is consistent with the data entity stored within the data store. Thus, the system can automatically maintain data consistency for a web application. A system, according to the embodiment, can offer a highly optimized improvement over traditional existing techniques for maintaining data consistency for a web application. The system can automatically manage version indicators for those data entities that are displayed or rendered in at least one updatable user interface component. Further, the system can also manage version indicators without generally requiring an application developer to modify the web application, such as modifying a presentation of the data within a user interface component of the web application. Thus, the system can efficiently provide automatic data consistency for all types of web applications, such as data services.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to automatically manage data consistency of a web application, the automatically managing comprising:
receiving a request for a resource of the web application from a user interface component, wherein a data entity is associated with the resource;
determining that the user interface component is an updatable user interface component;
retrieving a version indicator for the data entity from a data store, wherein the version indicator indicates a version of the data entity;
storing separately from the data store a mapping of an identity of the data entity and the version indicator within a resource scope, wherein the resource scope comprises a data repository associated with the resource, and wherein the resource scope is associated with a web browser session;
sending the data entity to the user interface component;
receiving a request to update the data entity from the user interface component, wherein the data entity is modified within the user interface component;
comparing the version indicator stored within the resource scope with the version indicator stored within the data store;
updating the data entity within the data store when the version indicator stored within the resource scope is identical to the version indicator stored within the data store; and
raising an exception when the version indicator stored within the resource scope is not identical to the version indicator stored within the data store, wherein the exception prevents updating of the data entity within the data store and is sent to the user interface component, and wherein the user interface component displays an error message or requests refreshing of the data entity in response to the received exception.

2. The non-transitory computer-readable medium of claim 1, wherein the data entity is displayed within the user interface component.

3. The non-transitory computer-readable medium of claim 2, wherein the user interface component is displayed within a graphical user interface of a web browser.

4. The non-transitory computer-readable medium of claim 1, the automatically managing further comprising incrementing the version indicator stored within the data store.

5. The non-transitory computer-readable medium of claim 4, wherein the version indicator stored within the data store is incremented when the user interface component updates the data entity within the data store;
wherein the automatically managing further comprises sending a notification to one or more additional user interface components that the version indicator stored within the data store has been incremented; and wherein a notification is not sent to the user interface component that updated the data entity.

6. The non-transitory computer-readable medium of claim 5, wherein the notification is sent to the one or more additional user interface components when the data entity is displayed or partially displayed within the one or more additional user interface components.

7. The non-transitory computer-readable medium of claim 4, wherein the data entity is displayed within each of the one or more additional user interface components in response to the notification that the version indicator stored within the data store has been incremented.

8. The non-transitory computer-readable medium of claim 4, wherein the version indicator stored within the data store is incremented when an additional user interface component updates the data entity within the data store.

9. The non-transitory computer-readable medium of claim 1, wherein the version indicator stored within the resource scope comprises a sequence.

10. The non-transitory computer-readable medium of claim 9, wherein the sequence comprises a timestamp.

11. The non-transitory computer-readable medium of claim 1, wherein the resource scope is stored within a web server.

12. The non-transitory computer-readable medium of claim 1, wherein the resource scope is stored within a web client that hosts the user interface component.

13. The non-transitory computer-readable medium of claim 1, wherein the version indicator stored within the resource scope is automatically stored within the resource scope when the data entity is displayed in at least one updatable user interface component.

14. The non-transitory computer-readable medium of claim 13, wherein the version indicator is no longer stored within the resource scope when the data entity is no longer displayed in the at least one updatable user interface component.

15. The non-transitory computer-readable medium of claim 1, wherein the version indicator is the only version indicator stored within the data store for the data entity.

16. A computer-implemented method for automatically managing data consistency of a web application, the computer-implemented method comprising:
receiving a request for a resource of the web application from a user interface component, wherein a data entity is associated with the resource;
determining that the user interface component is an updatable user interface component;
retrieving a version indicator for the data entity from a data store, wherein the version indicator indicates a version of the data entity;
storing separately from the data store a mapping of an identity of the data entity and the version indicator within a resource scope, wherein the resource scope comprises a data repository associated with the resource, and wherein the resource scope is associated with a web browser session;
sending the data entity to the user interface component;
receiving a request to update the data entity from the user interface component, wherein the data entity is modified within the user interface component;
comparing the version indicator stored within the resource scope with the version indicator stored within the data store;
updating the data entity within the data store when the version indicator stored within the resource scope is identical to the version indicator stored within the data store; and
raising an exception when the version indicator stored within the resource scope is not identical to the version indicator stored within the data store, wherein the exception prevents updating of the data entity within the data store and is sent to the user interface component, and wherein the user interface component displays an error message or requests refreshing of the data entity in response to the received exception.

17. The computer-implemented method of claim 16, further comprising incrementing the version indicator stored within the data store.

18. An automatic data consistency management system, comprising:
at least one memory configured to store a collection of software modules; and at least one processor configured to execute the collection of software modules, wherein the at least one processor is further configured, when executing the collection of software modules stored on the at least one memory, to:
receive a request for a resource of the web application from a user interface component, wherein a data entity is associated with the resource;
determine that the user interface component is an updatable user interface component;
retrieve a version indicator for the data entity from a data store, wherein the version indicator indicates a version of the data entity;
store separately from the data store a mapping of an identity of the data entity and the version indicator within a resource scope, wherein the resource scope comprises a data repository associated with the resource, and wherein the resource scope is associated with a web browser session;
send the data entity to the user interface component;
receive a request to update the data entity from the user interface component, wherein the data entity is modified within the user interface component;
compare the version indicator stored within the resource scope with the version indicator stored within the data store;
update the data entity within the data store when the version indicator stored within the resource scope is identical to the version indicator stored within the data store; and
raise an exception when the version indicator stored within the resource scope is not identical to the version indicator stored within the data store, wherein the exception prevents updating of the data entity within the data store and is sent to the user interface component, and wherein the user interface component displays an error message or requests refreshing of the data entity in response to the received exception.

19. The automatic data consistency management system of claim 18, wherein the at least one processor is further configured, when executing the collection of software modules stored on the at least one memory, to increment the version indicator stored within the data store.

* * * * *